United States Patent [19]
Lee

[11] Patent Number: 5,800,085
[45] Date of Patent: Sep. 1, 1998

[54] SEPARABLE KEYBOARD AND COMPUTERS HAVING THIS SEPARABLE KEYBOARD

[75] Inventor: Yl-Kwoun Lee, Kyungki-do, Rep. of Korea

[73] Assignee: SamSung Electronics Co., Ltd., Suwon, Rep. of Korea

[21] Appl. No.: 715,319

[22] Filed: Sep. 17, 1996

[30] Foreign Application Priority Data

Oct. 12, 1995 [KR] Rep. of Korea ................. 35197/1995

[51] Int. Cl.⁶ ............................................. B41J 5/10
[52] U.S. Cl. ..................... 400/489; 400/472; 400/682
[58] Field of Search ............................ 400/682, 489, 400/472; 361/680

[56] References Cited

U.S. PATENT DOCUMENTS

| 5,267,127 | 11/1993 | Pollitt | 400/682 |
| 5,318,367 | 6/1994 | Braun et al. | 400/82 |
| 5,336,001 | 8/1994 | Lichtenberg | 400/489 |
| 5,361,082 | 11/1994 | Chung | 400/489 |
| 5,388,921 | 2/1995 | Chung | 400/489 |
| 5,424,728 | 6/1995 | Goldstein | 341/22 |
| 5,454,652 | 10/1995 | Huellemeier et al. | 400/489 |
| 5,463,925 | 11/1995 | Galocy | 400/682 |
| 5,466,078 | 11/1995 | Szmanda et al. | 400/489 |
| 5,519,570 | 5/1996 | Chung | 400/489 |
| 5,543,787 | 8/1996 | Karidis et al. | 400/489 |
| 5,596,480 | 1/1997 | Manser et al. | 400/682 |
| 5,612,691 | 3/1997 | Murmann et al. | 400/489 |
| 5,613,786 | 3/1997 | Howell et al. | 400/472 |
| 5,651,622 | 7/1997 | Kim | 400/682 |

*Primary Examiner*—Edgar S. Burr
*Assistant Examiner*—Leslie Grohusky
*Attorney, Agent, or Firm*—Robert E. Bushnell, Esq.

[57] ABSTRACT

The present invention relates to a separable keyboard and computers having this separable keyboard which can be separated into two parts. This invention is particularly directed towards notebook or lap top computers. An essential feature of this invention is that the user can control the amount and degree to which the two keyboard halves are separated. Additional features include designs that allow the user to sense whether the keyboards are separating or locking into one of several possible discrete positions, and designs that prevent the keyboard halves from swerving or wobbling.

14 Claims, 6 Drawing Sheets

SEPARABLE KEYBOARD AND COMPUTERS HAVING THIS SEPARABLE KEYBOARD

CROSS-REFERENCE TO RELATED APPLICATIONS

This application makes reference to, incorporates the same herein, and claims all benefits accruing under 35 U.S.C. § 119 arising from an application for Separable Keyboard and Computers Having this Separable Keyboard earlier field in the Korean Industrial Property Office, on 12 Oct. 1995 and there duly assigned Ser. No. 35197/1995.

FIELD OF THE INVENTION

The present invention relates computers having a separable keyboard for ergonomic reasons. In particular, the present invention allows keyboard halves to separate to a finite number of discrete angles determined by the user, allowing the user more comfort during use.

BACKGROUND OF THE INVENTION

The present invention relates to keyboards that separate for ergonomic reasons. In particular, this invention is directed to notebook computers and lap top computers where space is limited and the device is compact. Especially important in this invention is the ability of having the user control the degree or amount of separation. U.S. Pat. No. 5,336,001 for a Maximum Comfort Keyboard to Lichtenberg discloses an ergonomically adjustable keyboard. Among the adjustments is the ability to pivotally rotate both halves of the keyboard away from each other at an angle desired by an individual user. This embodiment is discussed in column 8, lines 43–59.

U.S. Pat. No. 5,424,728 for a Keyboard to Goldstein discloses a keyboard that, among other tings, can pivotally rotate apart at an angle desired by the user. A ball and socket type hinge is used to control the angle of separation between the two halves of the keyboard. Goldstein's invention is directed towards keyboards used in computer terminals.

U.S. Pat. No. 5,318,367 for a Pivotable Keyboard Arrangement to Braun et al. discloses a keyboard for typewriters and for computer terminals that, among other features, can be pivotally separated. Column 3, lines 44–65 disclose how the two halves of the keyboard can be rotated apart at an angle as desired by the user.

Also, U.S. Pat. No. 5,454,652 for an Adjustable Keyboard to Huellemeier et al. discloses a keyboard that pivots apart. The keyboard is divided into two halves. Each half is monolithically attached to a pivot in the rear center comer. The rear, exterior corner of each half rotates backwards. As there are an infinite amount of angles possible, the keyboard halves are not restricted to opening to a predetermined angle. To rotate the keyboards apart, the user twists a lever. Huellemeier et al '652 is not limited to notebook or portable computers.

Generally, there are desktop computers and portable computers such as notebook computers. While an input device such as a keyboard of a desktop computer is sized to enough of a degree, a keyboard of a notebook computer is relatively difficult to use due to its small-size for easy portability. That is, since keyboards of notebook computers are manufactured so as to be compact in size so that the computers are easily carried, users that have a large build feel difficulty when using such computers. To remedy this problem, the separable keyboard has been applied to notebook computers. Some famous computer makers, i.e., International Business Machines Corporation and Apple Computer, Inc., have introduced computers having separable keyboards. For example, U.S. Pat. No. 5,543,787 for Maximum Keyboard Comfort to Lichtenberg discloses a notebook computer with a spreadable keyboard. Each half can be moved from left to right or can be moved orthogonally, from front to back. Another feature of the invention is that a spreadability of the keyboard is linked to the opening and closing of the cover of the notebook computer. It is not clear from the disclosure whether or not the user can adjust the distance to which each keyboard half moves to when the cover is opened.

What is needed is an adjustable keyboard for notebook and lap top computers that allows the user to control the degree and amount the keyboard halves separate. Better yet, what is also needed is an adjustable keyboard for a notebook computer where the user can sense when the keyboard halves are being adjusted to a new position. Finally, what is needed is an adjustable keyboard for a notebook computer that does not swerve or wobble upon adjustment.

SUMMARY OF THE INVENTION

The present invention is to provide an improved separable keyboard for computers and notebook computers. To achieve this object, the present invention provides a separable keyboard which is used as an input device of a computer, which can be separated into two parts toward both the left and the right sides. A means for controlling a separation comprise a shaft projecting downward below each side of the keyboard. Also below the left and the right sides of the keyboard are swerve preventive projecting shafts to prevent the keyboard halves from swerving and wobbling. In the base portion of the computer, a pair of recess slots are positioned on either side of the adjustment slot and running parallel to the adjustment slot, resulting in an elastic portion between the adjustment slot and each of the recess slots. This elastic portion on either side of the adjustment slot allows the user to sense when a keyboard half is moved to a new position. In one embodiment, the keyboard halves separate by rotating about a single pivot. In this embodiment, the adjustment slot, the recess slots, and the guiding slots each form an arc of one of a set of concentric circles centered about a pivot.

An second embodiment involves a second means for controlling the separation angle of the keyboard. The means includes a corrugated elastic plate firmly positioned and mated with a correspondingly corrugated surface. A movement of a keyboard section to the next discrete position involves sliding the corrugated elastic strip one pitch length over the adjoining corrugated surface, causing the corrugated elastic strip to again mate with the adjoining corrugated surface. In yet an additional embodiment, the keyboard halves can be separated from each other by translation. This can be accomplished by using shafts extending from the bottom of the keyboard halves in addition to adjustment slots, recess slots, and guiding slots positioned in the base portion of the computer.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE INVENTION

Figure 1:
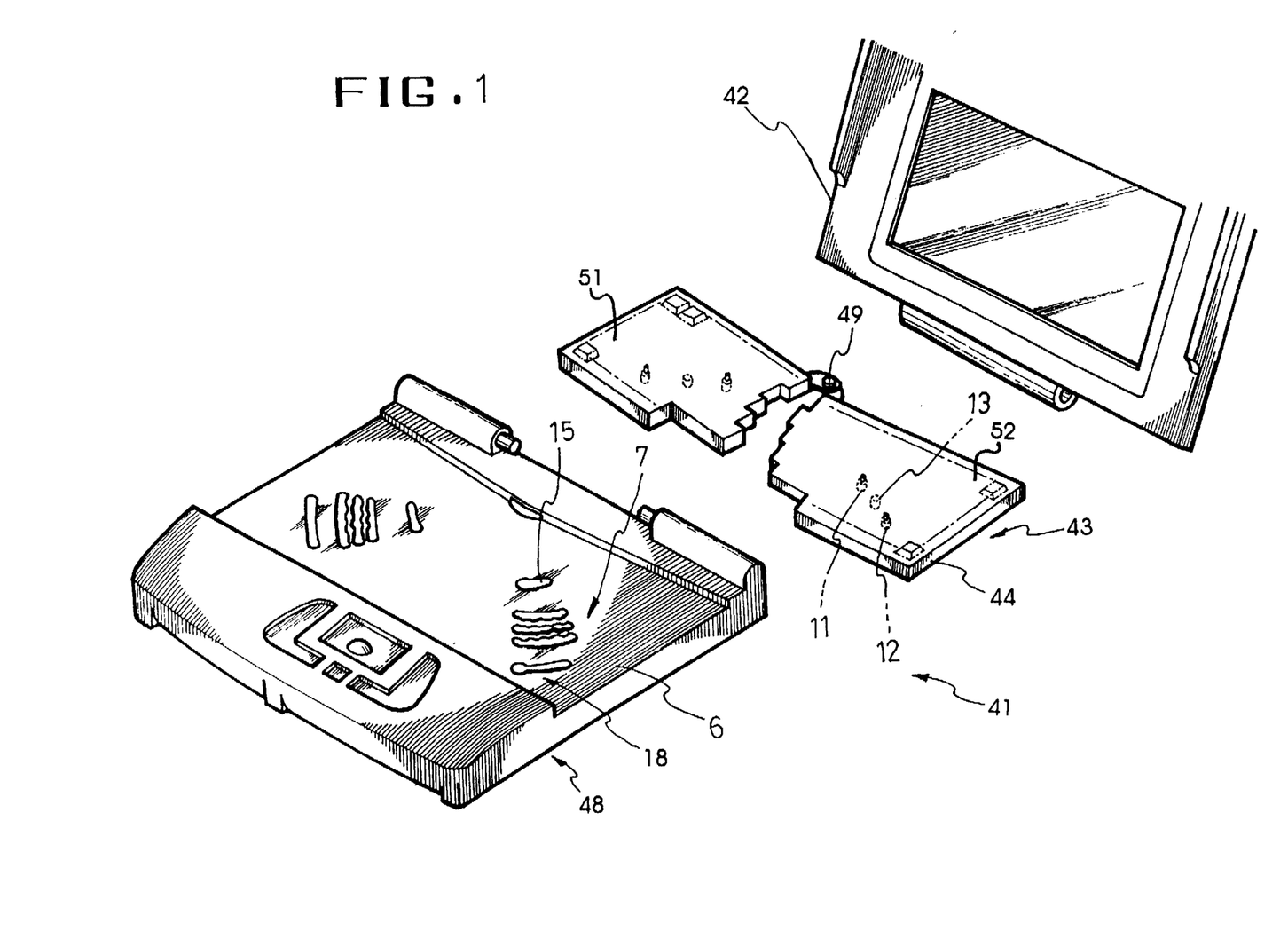
FIG. 1 is an exploded perspective view of a separable keyboard and a computer having a separable keyboard in accordance with a preferred embodiment of the present invention.
Figure 2:
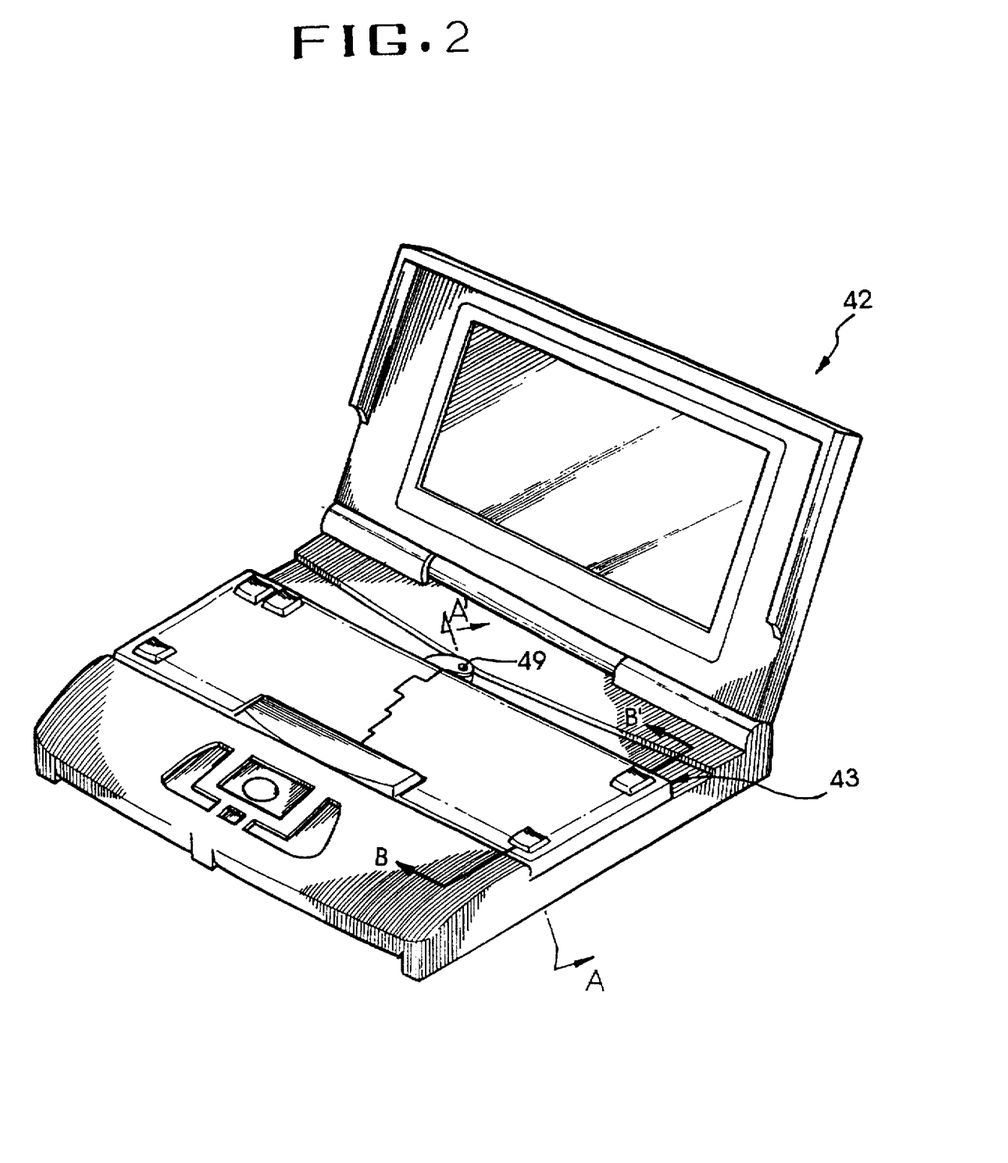
FIG. 2 is an external perspective view of a combined form of a notebook computer as shown in FIG. 1.
Figure 3:
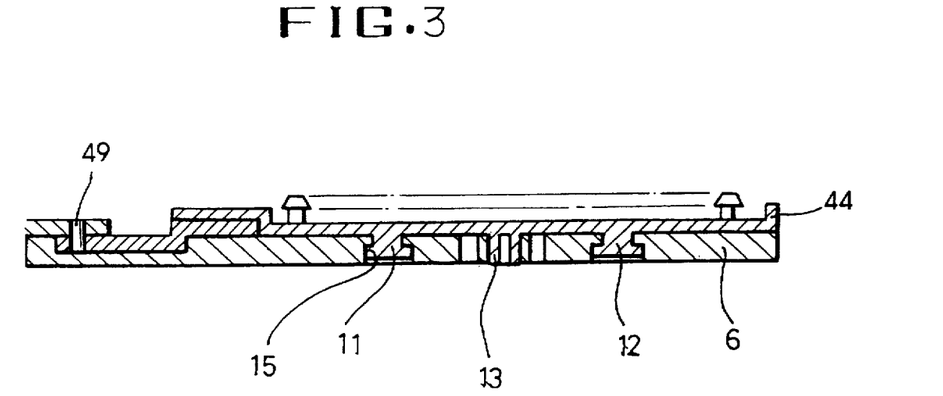
FIG. 3 is a cross sectional view in the direction of AA' as shown in FIG. 2.

Reference will now be made in detail to the preferred embodiment of the present invention. An example of which is illustrated in the accompanying drawings. In FIG. 1, computer 41 for which a separable keyboard according to the present invention is applied comprises a display part 42 and main body 48 having base portion 46 on which a separable keyboard 43 can be mounted. FIG. 1 also illustrates a separable keyboard 43 according one version of the first embodiment of the present invention. Keyboard 43 can be separated into two parts 51 and 52 about pivot 49 toward both the left and the right sides respectively. As for keys arranged on the keyboard, character keys of T, G, and B are located at the left side of the separable keyboard, while those of Y, H, and N are located at its right side. Also, each side of separable keyboard 43 includes an adjustment shaft 13 and swerve preventive projecting shafts 11 and 12, each extending from the bottom side of the keyboard 43.

Figure 4:
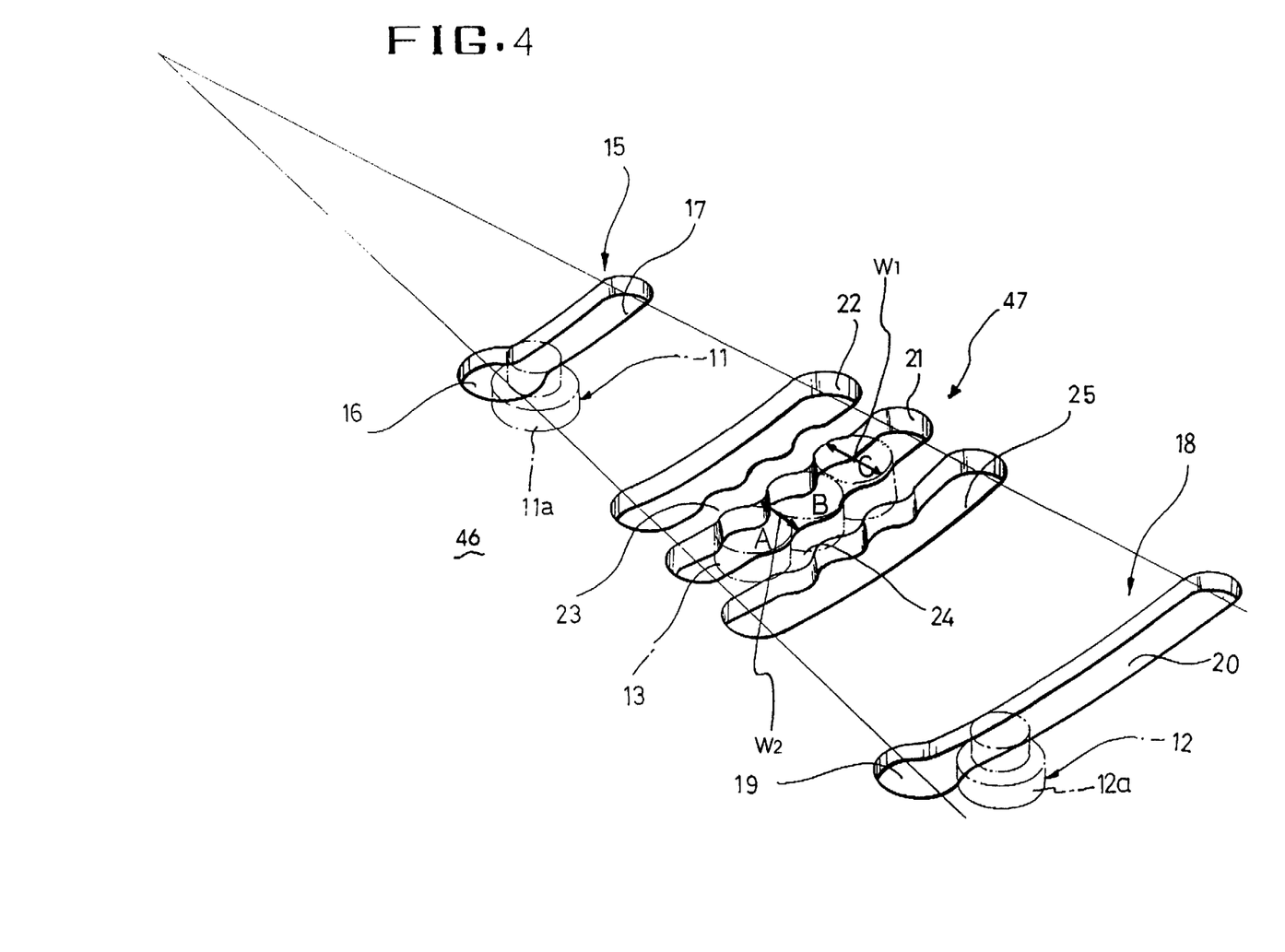
FIG. 4 is a view of part of the base portion according to the preferred embodiment of the present invention, which illustrates a separation angle of a separable keyboard which can be user controlled to one of several discrete angles.

As seen in FIGS. 1 and 4, each side of base portion 46 on main body 48 contains an adjustment means 47 that consists of a first guiding slot 15, a first recess slot 22, and adjustment slot 21, a second recess slot 25, and a second guiding slot 18. First recess slot 15, adjustment slot 21, and second guiding slot 18 accommodate swerve preventative shaft 11, adjustment shaft 13, and swerve preventative shaft 12 respectively.

Referring to FIG. 4, first guiding slot 15 can be divided into two portions. In one portion, first insertion hole 16 is located at one end of first guiding slot 15. First insertion hole 16 accommodates the insertion of flanged portion 11a of a swerve preventive projecting shaft 11 extending from keyboard 43 into first guiding slot 15. In the other portion of first guiding slot 15, slot portion 17 extends along the length of first guiding slot 15 starting from first insertion hole 16. The width of slot portion 17 is less than the diameter of first insertion hole 16. Slot portion 17 of first guiding slot 15 accommodates the movement of swerve preventative projecting shaft 11 while not accommodating the insertion or removal of flanged portion 11a of swerve preventative projecting shaft 11 into or out of first guiding slot 15.

Similarly, second guiding slot 18 can be divided into two portions. In one portion, second insertion hole 19 is located at one end of second guiding slot 18. Second insertion hole 19 accommodates the insertion of flanged portion 12a of a swerve preventive projecting shaft 12 of keyboard 43 into second guiding slot 18. In the other portion of second guiding slot 18, slot portion 20, extends along the length of second guiding slot 18 from second insertion hole 19. The width of slot portion 20 is less than the diameter of second insertion hole 19. Slot portion 20 of second guiding slot 18 accommodates the movement of swerve preventative projecting shaft 12 while not accommodating the insertion or removal of flanged portion 12a of swerve preventative projecting shaft 12 into or out of second guiding slot 18.

The adjustment slot 21 is surrounded by a first elastic portion 23 and a second elastic portion 24 respectively formed between adjustment slot 21 and first recess slot 22 and second recess slot 25 respectively. The purpose of recess slots 22 and 25 is to give the elastic portions 23 and 24 elasticity. Adjustment slot 21 is made up of a number of discrete positions where inserted adjustment shaft 13 can be moved to, allowing the keyboard half to click into place. At each discrete position, the width of W1 of adjustment slot 21 is wide, resulting in less flexure in first and second elastic portions 23 and 24 respectively when adjustment shaft 13 is located therein. Between discrete positions, the width W2 of adjustment slot 21 is significantly narrower than at W1, resulting in inserted adjustment shaft 13 creating much flexure in both first and second elastic portions 23 and 24 respectively. It is this flexure and the friction that results between first and second elastic portions 23 and 24 with inserted adjustment shaft 13 that allows the user to feel or sense when the keyboard half is moving into or out of one of the many discrete positions. In one version of the first embodiment keyboard halves 51 and 52 are each connected to pivot 49. Swerve preventive projecting shafts 11 and 12 are formed on opposite sides of adjustment shaft 13 on the bottom side 44 of both keyboard halves 51 and 52 of separable keyboard 43. In the preferred embodiment; keyboard halves 51 and 52 separate by rotating apart about pivot 49, causing shafts 11, 12, and 13 of each keyboard half 51 and 52 to trace out an arc from a set of concentric circles centered at pivot 49. Similarly, in this version of the first embodiment, first guiding slot 15, second guiding slot 18, first recess slot 22, second recess slot 25, and adjustment slot 21 all form an arc of a separate concentric circle under each keyboard halve, whose center is located at pivot 49. Flanged portions 11a and 12a of swerve preventive projecting shafts 11 and 12 are formed to guide the rotation of keyboard halves 51 and 52 as well as to prevent keyboard halves 51 and 52 from swerving and wobbling.

In this version of the first embodiment, a user can control the angle of separation between keyboard halves 51 and 52 of keyboard 43 within a limited range. As this is done, adjustment shaft 13 moves to any one of a plurality of discrete locations. FIG. 4 shows three discrete locations to which each keyboard half may move to. These discrete positions are labeled A, B, and C. Since adjustment shaft 13 has elasticity toward the elastic portions 23 and 24 during its movement, users can feel the change of the adjustment shaft 13 in positioning to different locations of the slot and control the separation angle as they wish. Furthermore, users can comfortably use their computers, since the installation of keyboard 43 is stable by the elasticity of an adjustment shaft 13, which attains its elasticity by the elastic portions 23 and 24, after the separation angle is adjusted.

Additional versions of the first embodiment are also possible, allowing the user to translate, instead of rotate, each keyboard half according to the principles of this first embodiment. In such a scenario, there would be no pivot 49, and first guiding slot 15, first recess slot 22, adjustment slot 21, second recess slot 25, and second guiding slot 18 would all be straight instead of curved, and adjustment shaft 13 and swerve preventing shafts 11 and 12 would trace out a straight line instead of an arc of a circle upon adjustment of keyboard 43.

Figure 5:
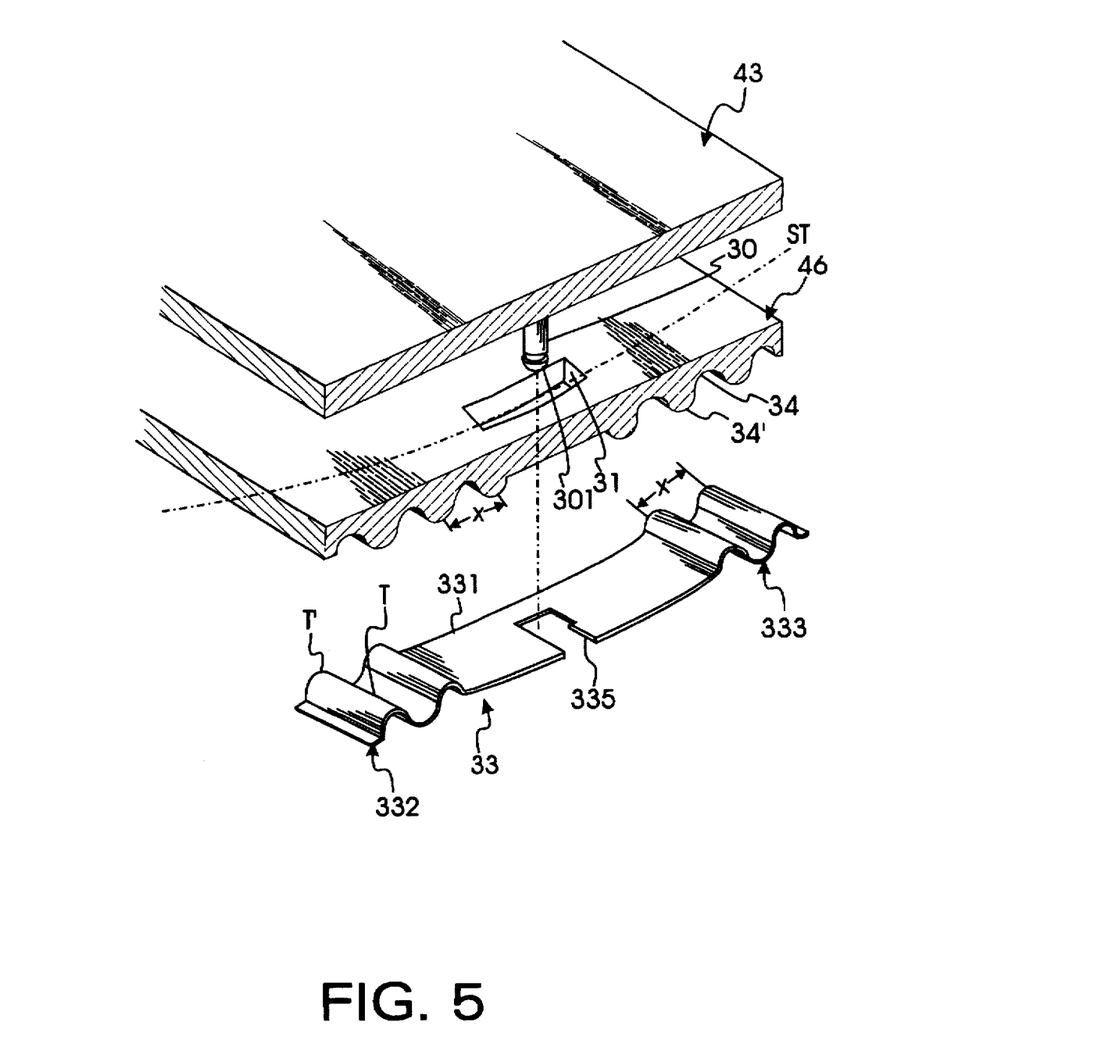
FIG. 5 is a view of the components used to adjust a separable keyboard according to the second embodiment of the present invention.
Figure 6:
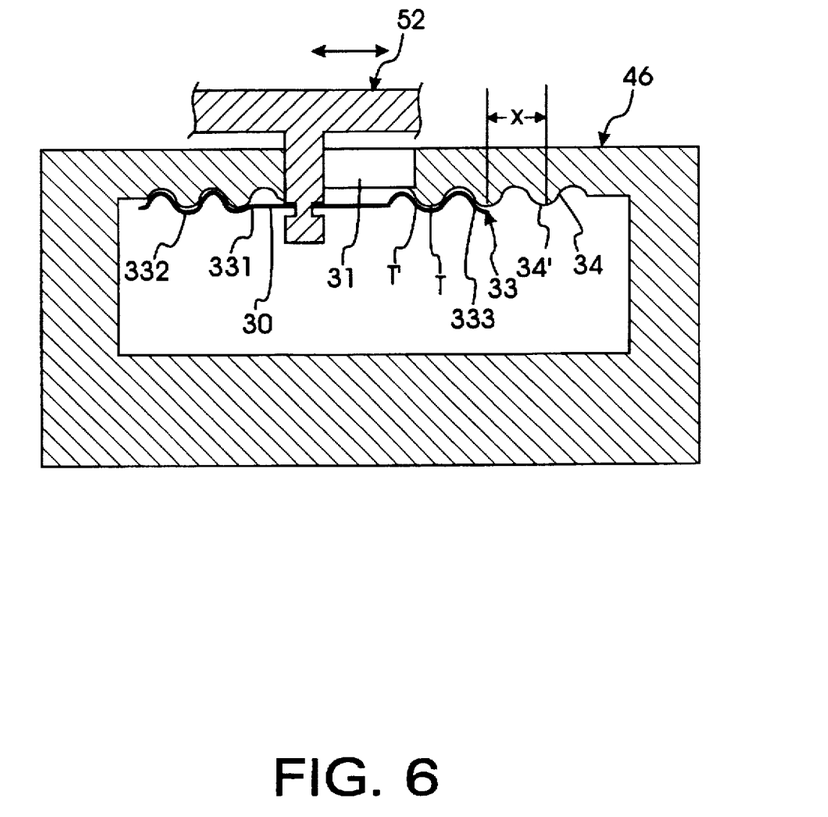
FIG. 6 is a cross sectional view in the direction of BB' as shown in FIG. 2, showing the components used to separate the keyboard according to the second embodiment of the present invention.

FIGS. 5 and 6 show the second embodiment according to the present invention for separating keyboard halves 51 and 52 of separable keyboard 43. Because the structure and operation is identical for both the right and the left keyboard halves 51 and 52 respectively, only the operation and construction of the right keyboard half will be described.

FIGS. 5 and 6 show shaft 30 extending from the bottom of right keyboard half 52, through elongate slot 31 of base portion 46, and coupling to elastic plate 33 located beneath base portion 46. Annular groove 301 formed at the tip of shaft 30 locks into coupling notch 335 of elastic plate 33 so that (1) elastic plate 33 is pressed up against the bottom side of base portion 46 and (2) right portion 52 of separable keyboard 43 moves in unison with elastic plate 33 to allow for keyboard separation adjustment.

As shown in FIG. 5, the bottom of base portion 46 is corrugated to the left and to the right of the ends of elongate slot 31. Each ruffle in the corrugation on the bottom of base plate 46 contains a concave portion 34 and a convex portion 34' forming a complete cycle having length or pitch X. Placed below base portion 46 is an elongate elastic strip 33 for keyboard angle adjustment. The elastic strip 33 has a center portion 331 on which a coupling notch 335 is formed for engagement with circumferential groove 301 formed at the tip of shaft 30, and wing portions 332 and 333 extending respectively from opposite ends of center portion 331 at obtuse angles. The wing portions 332 and 333 are also corrugated to mate and conform with the corrugated surface on the underside of base portion 46. This is because the orientations and the pitches of the corrugations for both the wing portions of the elastic strip and the underside of the base portion are equal. Each ruffle in the corrugation of wing portions 332 and 333 have concave portions T and convex portions T' formed alternatively, each having pitch X and orientation similar to that of 34 and 34' on the bottom surface of base portion 46.

Upon assembly, shaft 30 is inserted into slot 31. Coupling notch 335 of center portion 331 of elastic strip 33 connects with annular groove 301 of shaft 30, causing elastic strip 33 to become flat as shown in FIG. 6. As this occurs, concave portions T mate and conform to corresponding convex portions 34' and convex portions T' mate and conform with corresponding concave portions 34. When shaft 30 is attached to elastic strip 33, wing portions 332 and 333 of elastic strip 33 are pressed against the underside of base portion 46. This causes the concave portions and the convex portions T and T' to be tightly engaged with the concave and convex portions 34 and 34' forming a tight contact.

FIG. 6 shows the initial state of right keyboard half 52 before separation. If a user applies force to separate keyboard 43, shaft 30, downwardly extending from keyboard half 52, moves to the right along slot 31, as shown in FIG. 6. This causes elastic strip 33, attached to shaft 30, to move in the same direction. This causes convex portions T' of wing portions 332 and 333 of elastic strip 33 to move from one concave groove 34, pass over one convex portion 34', and move into an adjacent concave groove 34 formed on the bottom side of base portion 46. Because of the stressing and flexing caused as convex portions T' passes over convex portions 34', the user can sense and feel when the positioning of the keyboard halves are being changed and when the keyboard halves are securely positioned in discrete locations. The first discrete position is obtained by sliding right portion 52 of keyboard 43 to the right pitch distance X, defined by the pitch in the corrugation of elastic strip 33 and on the bottom side of base portion 46. Once the first discrete position is locked into, right portion 52 of keyboard 43 is stable since elastic strip 33 is pressed up against the bottom of base plate 46, forming a tight contact. As shown in FIG. 6, the user can continue to separate right keyboard half 52 by rotating it to a second separation angle by continuing to move right keyboard half 52 another pitch distance X to the right so that shaft 30 and elastic strip 33 are in their right most position. In this position, right portion 52 of keyboard 43 is rotated furthest from left portion 51.

In the preferred modification of the second embodiment, right portion 52 of keyboard 43 is adjustably rotated about pivot 49, resulting in slot 31 forming an arc ST of a circle and shaft 30 tracing out arc ST of the same circle. Additional modifications of this embodiment are also possible, allowing the user to translate instead of rotate each keyboard half according to the principles of this embodiment. In such a scenario, slot 31 would take the form of a rectangle and shaft 30 would trace out a perfectly straight line instead of an arc.

Due to this present invention, users can reduce their fatigue after using computers for a long time since the separation angle of the keyboard can be easily adjusted variably depending on users' physical characteristics. Furthermore, the adjustable angle of a separable keyboard according to the present invention increases comfort in using computers.

What is claimed is:

1. A separable keyboard, comprising:
   a keyboard separable into right and left sections, said keyboard having a top side and a bottom side, each section of said top side having a plurality of keys disposed thereon and each section of said bottom side having an adjustment shaft protruding therefrom; and
   a base having both left and right portions, each portion of said base being perforated by a plurality of adjustment slots, each of said adjustment slots having a plurality of discrete positions, said adjustment shafts being inserted into respective adjustment slots, allowing sidewalls of said adjustment slots to flex and enabling said adjustment shafts to be sequentially positioned into said plurality of discrete positions.

2. The separable keyboard of claim 1, said left and right portions of said base each having a pair of recess slots parallel to, adjacent, and on each side of said adjustment slots, said pair of recess slots providing elasticity to said sidewalls of said adjustment slots when said adjustment shafts are moved within respective adjustment slots.

3. The separable keyboard of claim 2, said left and said right portions further comprising:
   a pair of swerve preventative projecting shafts protruding from the bottom side of each section of said keyboard; and
   a first and a second guiding slot in said base plate, said first and said second guiding slots being parallel to said adjustment slot and said pair of recess slots, one of said pair of swerve preventative projecting shafts being inserted into said first guiding slot and the other of said pair of swerve preventative projecting shafts being inserted into said second guiding slot to prevent each one of said pair of keyboard sections from being inadvertently removed from said base plate.

4. The separable keyboard of claim 3, said adjustment slot traces an arc of a circle.

5. The separable keyboard of claim 4, a first elastic portion being formed between said adjustment slot and one of said pair of recess slots and a second elastic portion being formed between said adjustment slot and said other of said pair of recess slots allowing said first and said second elastic portions to flex as said adjustment shaft is moved between said plurality of discrete positions.

6. A separable keyboard structure for a notebook computer, comprising:

a base, each half of said base being perforated by an adjustment slot, said adjustment slot having resilient and flexible sidewalls providing a plurality of successive discrete positions; and a keyboard separable into two halves, each half having a top side and a bottom side, said top side having a plurality of keys disposed thereon, said bottom side of each half having a adjustment shaft protruding from said bottom side, said adjustment shaft engaging said adjustment slot of said base and successively moving into said discrete positions in said adjustment slot.

7. The separable keyboard of claim 6, said base being perforated by a pair of recess slots parallel to and near said adjustment slot to provide elasticity and flexibility to said side walls of said adjustment slot when said adjustment shaft moves between said discrete positions.

8. The separable keyboard of claim 7, wherein said base is perforated by a first and a second guiding slot parallel to said adjustment slot to prevent said keyboard halves from inadvertently being removed from said base.

9. The separable keyboard of claim 8, wherein said top plate contains a pair of swerve preventative project shafts for engaging said base at said first and said second guiding slots.

10. A separable keyboard, comprising:

a keyboard separable into right and left sections, said keyboard having a top side and a bottom side, said top side having a plurality of keys disposed thereon and said bottom side having an adjustment shaft and a pair of swerve preventative projecting shafts protruding therefrom; and a base having both left and right portions, said base being perforated by an adjustment slot, a recess slot, and a guiding slot in both said left and said right sections, said adjustment shaft and a swerve preventative projecting shaft slidably attached to said adjustment slot and said guiding slot respectively allowing left and right sections of said keyboard to rotate about said base and hinder said keyboard from becoming detached from said base.

11. The separable keyboard of claim 10, said adjustment slot, said recess slot, and said guiding slot comprising concentric arcs, wherein an innermost one of said arcs comprises one of said guiding slot, an outermost one of said arcs comprises another one of said pair of guiding slots, and a middle one of said concentric arcs comprises said adjustment slot each accommodating one of said swerve preventative projecting shafts.

12. The separable keyboard of claim 11, wherein second a innermost concentric arc and a second outermost concentric arc each comprise a recess slot, vacant and do not accommodate a keyboard.

13. The separable keyboard of claim 11, wherein said adjustment slot is grooved allowing said accommodated adjustment shaft to naturally flex into one of a plurality of positions.

14. The separable keyboard of claim 13, said recess slot being close to said adjustment slot allowing sidewalls of said adjustment slot to flex as said adjustment shaft moves between any successive two of said plurality of position.

* * * * *